(12) United States Patent
Lin et al.

(10) Patent No.: US 10,484,702 B2
(45) Date of Patent: *Nov. 19, 2019

(54) ENCODING/DECODING METHOD AND APPARATUS WITH VECTOR DERIVATION MODE

(71) Applicant: HUAWEI TECHNOLOGIES CO., LTD., Shenzhen, Guangdong (CN)

(72) Inventors: Sixin Lin, Shenzhen (CN); Mingyuan Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/822,657

(22) Filed: Nov. 27, 2017

(65) Prior Publication Data
US 2018/0077424 A1 Mar. 15, 2018

Related U.S. Application Data

(63) Continuation of application No. 14/020,953, filed on Sep. 9, 2013, now Pat. No. 9,860,531, which is a (Continued)

(30) Foreign Application Priority Data

Mar. 10, 2011 (CN) .......................... 2011 1 0057554

(51) Int. Cl.
*H04N 7/12* (2006.01)
*H04N 19/513* (2014.01)
(Continued)

(52) U.S. Cl.
CPC .......... *H04N 19/513* (2014.11); *H04N 19/51* (2014.11); *H04N 19/517* (2014.11);
(Continued)

(58) Field of Classification Search
CPC .... H04N 19/513; H04N 19/51; H04N 19/517; H04N 19/567; H04N 19/56; H04N 19/523
See application file for complete search history.

(56) References Cited

U.S. PATENT DOCUMENTS

2002/0196362 A1   12/2002   Yang et al.
2004/0234143 A1*  11/2004   Hagai .................. H04N 19/105
                                              382/238
(Continued)

FOREIGN PATENT DOCUMENTS

CN   101965733      2/2011
WO   WO2009131075  10/2009
WO   WO2010086041   8/2010

OTHER PUBLICATIONS

Steffen Kamp et al., *Description of video coding technology proposal by RWTH Aachen University*, Joint Collaborative Team on Video Coding (JCT-VC) of ITU-T SG16 WP3 and ISO/IEC JTC1/SC29/WG11, 1$^{st}$ Meeting, Dresden, DE, Apr. 15-23, 2010, XP030007549, JCTVC-A112, pp. 1-23.

(Continued)

*Primary Examiner* — Richard T Torrente
(74) *Attorney, Agent, or Firm* — Fish & Richardson P.C.

(57) ABSTRACT

An encoding method, a decoding method, an encoding apparatus, a decoding apparatus, for a video image. The encoding method includes: determining an optimal merged neighboring block for a current block based on a motion vector merging technology; determining, based a prediction direction of the optimal merged neighboring block, a motion vector derivation mode that needs to be used by a decoder; correcting a motion vector of the current block based on the motion vector derivation mode; and determining a residual between a predicted value and an original value of the current block based on the corrected motion vector, thereby (Continued)

encoding the current block. According to the technical solutions, a more accurate predicted value is obtained by correcting the motion vector, and a smaller residual is generated.

16 Claims, 8 Drawing Sheets

Related U.S. Application Data continuation of application No. PCT/CN2011/081497, filed on Oct. 28, 2011.

(51) Int. Cl.
| | |
|---|---|
| *H04N 19/517* | (2014.01) |
| *H04N 19/51* | (2014.01) |
| *H04N 19/56* | (2014.01) |
| *H04N 19/523* | (2014.01) |
| *H04N 19/567* | (2014.01) |

(52) U.S. Cl.
CPC ............ *H04N 19/523* (2014.11); *H04N 19/56* (2014.11); *H04N 19/567* (2014.11)

(56) References Cited

U.S. PATENT DOCUMENTS

| | | | |
|---|---|---|---|
| 2009/0232215 A1 | 9/2009 | Park et al. | |
| 2010/0014588 A1 | 1/2010 | Nakazato et al. | |
| 2010/0053451 A1* | 3/2010 | Seong | H04N 7/0132 348/699 |
| 2011/0002390 A1* | 1/2011 | Chiu | H04N 19/56 375/240.16 |
| 2011/0176611 A1 | 7/2011 | Huang et al. | |
| 2011/0261886 A1 | 10/2011 | Suzuki et al. | |

OTHER PUBLICATIONS

Yi-Jen Chiu et al., *TEI: Fast techniques to improve self derivation of motion estimation*, Joint Collaborative Team on Video Coding (JCT-VC) of ITU-T SG16 WP3 and ISO/IEC JTC1/SC29/WG11, 2$^{nd}$ Meeting, Geneva, CH, Jul. 21-28, 2010, XP030007627, JCTVC-B047, pp. 1-9.

Yi-Jen Chiu et al., *Self-derivation of motion estimation techniques to improve vedio coding efficiency*, Proc. of SPIE, vol. 7798, 77980Z-1, Aug. 19, 2010, XP055096206 (10 pp.).

Steffen Kamp et al., *Decoder-side motion vector derivation for hybrid video inter coding*, 2010 IEEE, XP031761432, pp. 1277-1280.

Steffen Kamp et al., *Decoder side motion vector derivation for inter frame video coding*, IEEE 2008, XP031374203, pp. 1120-1123.

Sven Klomp et al., *Decoder-side block motion estimation for H.264/MPEG-4 AVC based video coding*, 2009 IEEE, XP031479529, pp. 1641-1644.

Yoshinori Suzuki et al., *CE9: 3.1 PU Merge and Skip tools and proposed improvements*, Joint Collaborative Team on Video Coding (JCT-VC) of ITU-T SG16 WP3 and ISO/IEC JTC1/SC29/WG11, 4$^{th}$ Meeting, Daegu, Korea, Jan. 20-28, 2011, JCTVC-D233r1, pp. 1-7.

International Search Report, dated Feb. 9, 2012, in International Application No. PCT/CN2011/081497 (3 pp.).

Written Opinion of the International Searching Authority, dated Feb. 9, 2012, in International Application No. PCT/CN2011/081497 (10 pp.).

Extended European Search Report, dated Jan. 23, 2014, in European Application No. 11860536.9 (10 pp.).

Communication Pursuant to Article 94(3) EPC, dated Jul. 7, 2017, in European Application No. 11860536.9 (6 pp.).

Search Report, dated Feb. 2, 2014, in Chinese Application No. 2011100575541 (2 pp.).

Office Action, dated Mar. 3, 2014, in in Chinese Application No. 201110057554.1 (5 pp.).

Office Action, dated Mar. 18, 2016, in U.S. Appl. No. 14/020,953 (28 pp.).

Final Office Action, dated Jul. 22, 2016, in U.S. Appl. No. 14/020,953 (8 pp.).

Advisory Action, dated Oct. 17, 2016, in U.S. Appl. No. 14/020,953 (4 pp.).

Office Action, dated Nov. 10, 2016, in U.S. Appl. No. 14/020,953 (9 pp.).

Final Office Action, dated Mar. 23, 2017, in U.S. Appl. No. 14/020,953 (10 pp.).

Advisory Action, dated May 26, 2017, in U.S. Appl. No. 14/020,953 (3 pp.).

Notice of Allowance, dated Aug. 28, 2017, in U.S. Appl. No. 14/020,953 (5 pp.).

U.S. Appl. No. 14/020,953, filed Sep. 9, 2013, Sixin Lin et al., Huawei Technologies Co., Ltd.

* cited by examiner

ENCODING/DECODING METHOD AND APPARATUS WITH VECTOR DERIVATION MODE

CROSS-REFERENCE TO RELATED APPLICATIONS

This application is a continuation of U.S. patent application Ser. No. 14/020,953, filed on Sep. 9, 2013, which is a continuation of International Application No. PCT/CN2011/081497, filed on Oct. 28, 2011, which claims priority to Chinese Patent Application No. 201110057554.1, filed on Mar. 10, 2011. All of the aforementioned patent applications are hereby incorporated by reference in their entireties.

TECHNICAL FIELD

Embodiments of the present invention relate to the image processing field, and in particular, to an encoding/decoding method, an encoding apparatus, a decoding apparatus, and a system for a video image in the image processing field.

BACKGROUND

Motion estimation and motion compensation are important technologies for video compression. A considerable part of bits in a compressed video bit-stream are used to transmit motion vector information. Motion information of a block may include a prediction direction, a motion vector, and reference frame information of the block. The reference frame information may represent a frame or frames that are referenced for obtaining the block. In cases of a low bit rate, especially for a high-definition video, bits consumed to transmit motion vector information generally account for over 50% of the total number of bits in a bitstream. Therefore, it is very important to efficiently encode the motion information.

At present, inter-frame prediction technologies for improving motion prediction/compensation mainly include a decoder motion vector derivation technology and a motion vector merging technology.

In the decoder motion vector derivation technology, an encoder and a decoder need to process a block by using the same search/derivation mechanism in a large range. With respect to a block that is encoded by the encoder according to this technology, the decoder restores the block by using a specific search/derivation mechanism in a large range. For example, by fully using correlation between a block and an adjacent encoded (or decoded) region in a current frame where the block is located, or using correlation between a block and previous and next adjacent encoded (or decoded) frames of the current frame where the block is located, decoding is performed by performing search/derivation in a large range. This method may achieve high compression performance; however, the encoder and the decoder need to perform search/derivation in a large range of image frames, which is highly complex in calculation.

In the motion vector merging technology, by using strong correlation between a motion vector of a current block and a motion vector of a block, a motion vector of a closest neighboring block may be used to replace the motion vector of the current block, so that an index value of the neighboring block is used to replace the motion vector of the current block during encoding to reduce encoded bits, where the neighboring block is an optimal merged candidate block of the current block. A neighboring block of the current block refers to a block whose position is any one of the following positions: corresponding positions in previous and next adjacent frames of the current block, an upper side of the current block, a left side of the current block, an upper-left corner of the current block, and an upper-right corner of the current block. In the prior art, circumstances under which the motion vector merging technology may be used are disclosed, and how to determine the optimal merged candidate block of the current block is also disclosed. In a case where the motion vector merging technology can be used, an encoder determines one of neighboring blocks as an optimal merged candidate block for a current block, uses a motion vector thereof to replace a motion vector of the current block, and transmits an index value of position information of the optimal merged candidate block as the encoding information of the current block to a decoder; the decoder determines the motion vector of the current block according to the index value to find a reference block of the current block, thereby determining a predicted value of motion compensation of the current block.

In the motion vector merging technology, by using the encoding index value instead of the motion vector of the current block, encoding efficiency may be improved; however, the motion vector of the current block is not exactly the same as the motion vector of the neighboring block, and there is a big error if the motion vector of the neighboring block is directly used to replace the motion vector of the current block; consequently, accuracy of motion compensation decreases, image compression is affected, and encoding quality of an image deteriorates.

Although the encoder may encode a motion vector difference existing between the motion vector of the current block itself and the motion vector of the optimal merged candidate block in a case where the motion vector of the current block is replaced with the motion vector of the optimal merged candidate block, so as to correct the motion vector of the current block on the decoder, the encoded motion vector difference may occupy a large number of bits in an encoded bit stream, which affects encoding efficiency. Although the encoder may also encode a residual between the motion vector of the optimal merged candidate block for the current block and an original value of the current block, transmit the residual to the decoder for correction, because the residual between the motion vector of the optimal merged candidate block for the current block and the original value of the current block is large, the residual may occupy a large number of bits in the encoded bit stream, which also affects encoding efficiency.

SUMMARY

Embodiments of the present invention provide an encoding/decoding method, an encoding apparatus, a decoding apparatus, and a system for a video image, which may effectively reduce a predication deviation caused because a motion vector of a current block and a motion vector of an optimal merged candidate block are not exactly the same when a motion vector merging technology is used, so that a predicted value for the current block is more accurate and a residual is smaller, thereby improving encoding efficiency and avoiding an increase in data bandwidth.

An embodiment of the present invention provides an encoding method for a video image, including: determining an optimal merged candidate block for a current block based on a motion vector merging technology; determining, based on a prediction direction of the optimal merged candidate block, a motion vector derivation mode that needs to be used by a decoder; correcting a motion vector of the current block based on the motion vector derivation mode; and determining a residual between a predicted value and an original value of the current block based on the corrected motion vector, thereby encoding the current block.

An embodiment of the present invention provides a decoding method for a video image, including: determining an optimal merged candidate block for a current block based on an encoded bit stream obtained by using a motion vector merging technology; when a motion vector derivation mode needs to be used, determining, based on a prediction direction of the optimal merged candidate block, the motion vector derivation mode that needs to be used; correcting a motion vector of the current block based on the motion vector derivation mode; and decoding the current block based on the corrected motion vector and a residual carried in the encoded bit stream.

An embodiment of the present invention provides an encoding apparatus for a video image, including: a first determining module, configured to determine an optimal merged candidate block for a current block based on a motion vector merging technology; a second determining module, configured to determine, based a prediction direction of the optimal merged candidate block, a motion vector derivation mode that needs to be used by a decoder; a correcting module, configured to correct a motion vector of the current block based on the motion vector derivation mode; and an encoding module, configured to determine a residual between a predicted value and an original value of the current block based on the corrected motion vector, thereby encoding the current block.

An embodiment of the present invention provides a decoding apparatus for a video image, including: a first determining module, configured to determine an optimal merged candidate block for a current block based on an encoded bit stream obtained by using a motion vector merging technology; a second determining module, configured to determine, based on a prediction direction of the optimal merged candidate block, a motion vector derivation mode that needs to be used when the motion vector derivation mode needs to be used; a correcting module, configured to correct a motion vector of the current block based on the motion vector derivation mode; and a decoding module, configured to decode the current block based on the corrected motion vector and a residual carried in the encoded bit stream.

An embodiment of the present invention further provides a system for a video image, where the system includes an encoding apparatus and a decoding apparatus. The encoding apparatus includes: a first determining module, configured to determine an optimal merged candidate block for a current block based on a motion vector merging technology; a second determining module, configured to determine, based a prediction direction of the optimal merged candidate block, a motion vector derivation mode that needs to be used by a decoder; a correcting module, configured to correct a motion vector of the current block based on the motion vector derivation mode; and an encoding module, configured to determine a residual between a predicted value and an original value of the current block based on the corrected motion vector, thereby encoding the current block. The decoding apparatus includes: a first determining module, configured to determine an optimal merged candidate block for a current block based on an encoded bit stream obtained by using a motion vector merging technology; a second determining module, configured to determine, based on a prediction direction of the optimal merged candidate block, a motion vector derivation mode that needs to be used when the motion vector derivation mode needs to be used; a correcting module, configured to correct a motion vector of the current block based on the motion vector derivation mode; and a decoding module, configured to decode the current block based on the corrected motion vector and a residual carried in the encoded bit stream.

Based on the above technical solutions, a motion vector of a current block is determined firstly according to a motion vector of an optimal merged candidate block, and a motion vector derivation mode is used to correct the motion vector of the current block; therefore, the motion vector of the current block is more accurate, a calculated residual is smaller, and the residual occupies a smaller number of bits in an encoded bit stream, thereby improving encoding efficiency and avoiding an increase in data bandwidth. Meanwhile, because the corrected motion vector is used, a predicted value estimated based on the corrected motion vector is closer to an original value of the current block, and because correction is performed by using the residual, a more accurate decoding result may be obtained, thereby improving image decoding quality.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Firstly, an encoding method 100 for a video image according to an embodiment of the present invention is described with reference to FIG. 1.

Figure 1:
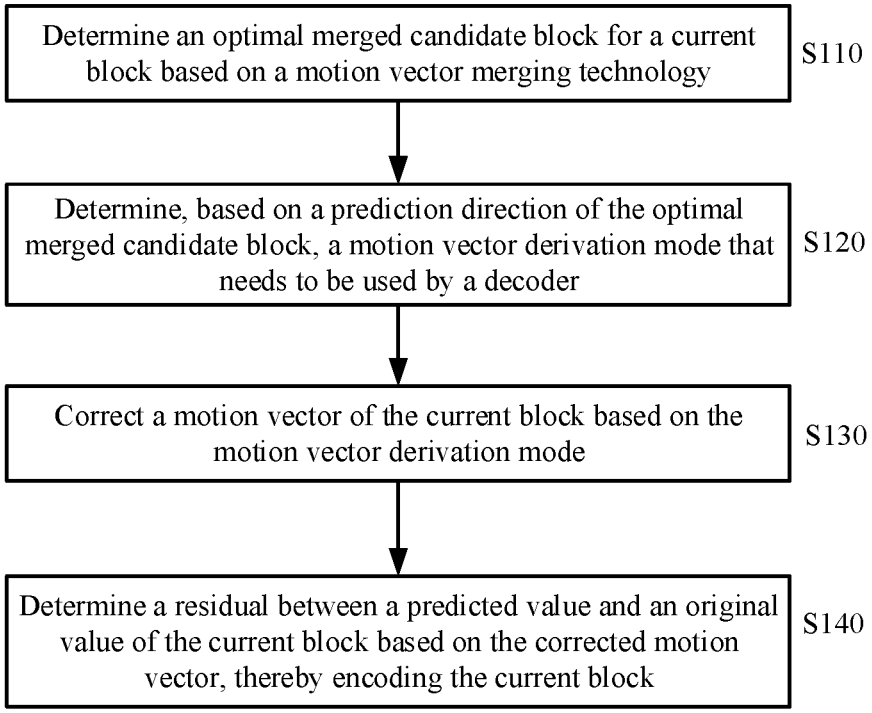
FIG. 1 is a flowchart of an encoding method for a video image according to an embodiment of the present invention.

As shown in FIG. 1, the method 100 includes the following: in S110, an optimal merged candidate block for a current block is determined based on a motion vector merged technology; in S120, a motion vector derivation mode that needs to be used by a decoder is determined based a prediction direction of the optimal merged candidate block; in S130, a motion vector of the current block is corrected based on the motion vector derivation mode; and in S140, a residual between a predicted value and an original value of the current block is determined based on the corrected motion vector, thereby encoding the current block.

On an encoder, an optimal merged candidate block may be determined based on a motion vector merging technology, thereby determining an initial motion vector of a current block. Then, according to whether a prediction direction of the optimal merged candidate block is bi-directional prediction, forward prediction, or backward prediction, a motion vector derivation technology is determined to correct the initial motion vector of the current block. After the corrected motion vector is obtained, a predicted value of the current block may be determined based on the motion vector. Because the encoder is aware of an original value of the current block, a residual between the predicted value and the original value may be calculated, and the residual may be encoded into an encoded bit stream together with an index value of the optimal merged candidate block.

According to the encoding method provided by the embodiment of the present invention, a motion vector of a current block is determined firstly according to a motion vector of an optimal merged candidate block, and a motion vector derivation mode is used to correct the motion vector of the current block; therefore, the motion vector of the current block is more accurate, a calculated residual is smaller, and the residual occupies a smaller number of bits in an encoded bit stream, thereby improving encoding efficiency and avoiding an increase in data bandwidth. Meanwhile, because the corrected motion vector is used, a predicted value estimated based on the corrected motion vector is closer to an original value of the current block, and because correction is also implemented to the residual, a more accurate decoding result may be obtained by a decoder, thereby improving image decoding quality.

The encoding method 100 provided by the embodiment of the present invention is described in detail as follows:

In S110, an optimal merged candidate block for a current block is determined based on a motion vector merging technology.

This step is basically the same as the prior art. A motion vector of the optimal merged candidate block is a motion vector that is closest to a motion vector of the current block. When the optimal merged candidate block is obtained based on the motion vector merging technology, motion information of the optimal merged candidate block, for example, a prediction direction, a prediction vector, and reference frame information of the optimal merged candidate block, may be determined.

In S120, a motion vector derivation mode that needs to be used by a decoder is determined based on the prediction direction of the optimal merged candidate block.

When the prediction direction of the optimal merged candidate block is bi-directional prediction, the motion vector derivation mode that needs to be used by the decoder may be searching two frames, namely, a forward reference frame and a backward reference frame, for reference blocks of the current block, where positions of the reference blocks in the two frames vary as the search is performed, and then reference blocks that meet a specific condition are selected from the found reference blocks. In the following, this motion vector derivation mode is also referred to as a bi-directional mode.

When the prediction direction of the optimal merged candidate block is forward prediction, the motion vector derivation mode that needs to be used by the decoder may be: fixing a reference block of the current block in a forward reference frame by using a candidate motion vector (that is, the motion vector of the optimal merged candidate block) in the motion information of the optimal merged candidate block; searching a backward reference frame for a reference block, where a position of the reference block in the backward reference frame varies as the search is performed; and then selecting a reference block that meets a specific condition from the found reference blocks. In the following, this motion vector derivation mode is also referred to as a forward mode.

When the prediction direction of the optimal merged candidate block is backward prediction, the motion vector derivation mode that needs to be used by the decoder may be: fixing a reference block of the current block in a backward reference frame by using a candidate motion vector in the motion information of the optimal merged candidate block; searching a forward reference frame for a reference block, where a position of the reference block in the forward reference frame varies as the search is performed; and then selecting a reference block that meets a specific condition from the found reference blocks. In the following, this motion vector derivation mode is also referred to as a backward mode.

The specific condition may refer to a minimum matching error, and is described in detail in the following.

In S130, the motion vector of the current block is corrected based on the motion vector derivation mode.

Under the motion vector derivation mode determined in S120, a method corresponding to the determined motion vector derivation mode is used to correct the motion vector of the current block. It may be regarded that the three motion vector derivation modes set three schemes about how to correct a motion vector. If it is determined to use one of the motion vector derivation modes, the motion vector is corrected under a scheme corresponding to the motion vector derivation mode. For example, if the motion vector derivation mode determined in S120 is a bi-directional mode, two frames, namely, a forward reference frame and a backward reference frame, are searched for reference blocks of the current block, where positions of the reference blocks in the two frames vary as the search is performed, and then reference blocks that meet a specific condition are selected from the found reference blocks. The motion vector of the current block is corrected by using the reference blocks that are found according to this mode.

According to an embodiment of the present invention, under the determined motion vector derivation mode, the motion vector of the current block may be corrected according to the motion vector and reference frame information of the optimal merged candidate block.

In the motion vector merging technology, when the optimal merged candidate block of the current block is determined, the motion vector of the current block is the motion vector of the optimal merged candidate block. Because the motion vector of the current block is not exactly the same as the motion vector of the optimal merged candidate block, the motion vector of the current block needs to be corrected. The correction process may use the motion vector and reference frame information of the optimal merged candidate block. For example, the motion vector of the current block may be corrected by searching a reference frame of the current block for a reference block that meets a specific condition. The specific condition may be a minimum matching error between found reference blocks.

Figure 2:
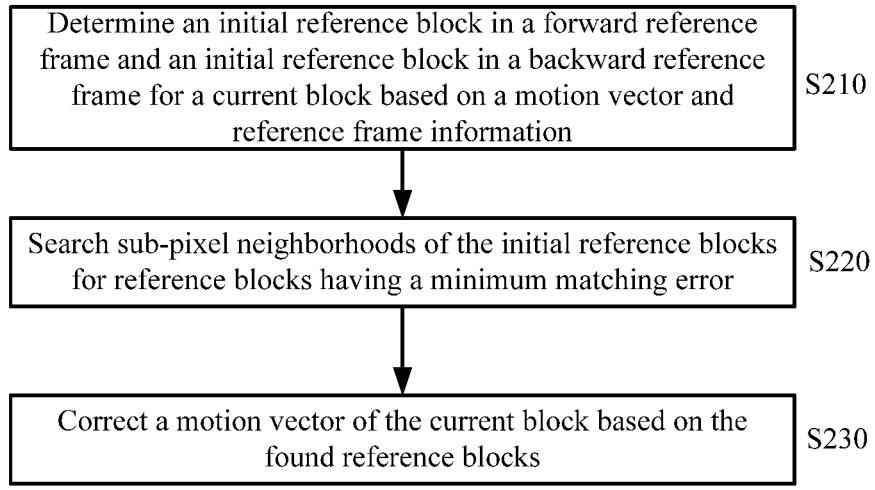
FIG. 2 is a flowchart of a method for correcting a motion vector according to an embodiment of the present invention.

According to an embodiment of the present invention, a method 200 shown in FIG. 2 may be used to correct a motion vector of a current block.

In S210, an initial reference block in a forward reference frame and an initial reference block in a backward reference frame are determined for the current block based on a motion vector and reference frame information.

In a bi-directional mode, a forward reference frame and a backward reference frame of a current block may be determined based on reference frame information of an optimal scheme candidate block. A motion vector of the current block may be determined based on a motion vector of the optimal scheme candidate block, thereby determining an initial reference block in the forward reference frame and an initial reference block in the backward reference frame for the current block.

In a forward mode, a forward reference frame of a current block may be determined based on reference frame information of an optimal scheme candidate block. An initial reference block in the forward reference frame may be determined for the current block based on a motion vector of the optimal scheme candidate block. A backward reference frame of the current block may be a reference frame immediately following a frame where the current block is located. In the backward reference frame of the current block, a position indicated by a zero motion vector is used as a reference block of the current block. That is, in the backward reference frame, a block that is located in the same position as the current block is the initial reference block of the current block.

In a backward mode, a backward reference frame of the current block may be determined based on reference frame information of an optimal scheme candidate block. An initial reference block in the backward reference frame may be determined for the current block based on a motion vector of the optimal scheme candidate block. A forward reference frame of the current block may be a reference frame immediately preceding a frame where the current block is located. In the forward reference frame of the current block, a position indicated by a zero motion vector is used as a reference block of the current block. That is, in the forward reference frame, a block that is located in the same position as the current block is the initial reference block of the current block.

By using the above modes, the initial reference block in the forward reference frame and the initial reference block in the backward reference frame may be determined for the current block.

In S220, sub-pixel neighborhoods of the initial reference blocks are searched for reference blocks having a minimum matching error.

A sub-pixel neighborhood of a block may be a region that takes an upper-left pixel of the block as a circle center, and a ½ or ¼ pixel distance as a radius. The sub-pixel neighborhood of an initial reference block may be a region that takes a point indicated by the initial motion vector of the current block, that is, a point at an upper-left corner of the initial reference block, as a circle center, and a specific pixel distance as a radius. In the search of reference blocks, the motion vector of the current block is modified so that the indicated point moves within the sub-pixel neighborhood, thereby obtaining different reference blocks. In this case, interpolation needs to be performed between relevant pixels, thereby determining a pixel value after the position of the reference block is moved by a small distance.

When reference blocks having a minimum matching error are determined within sub-pixel neighborhoods, the motion vector is corrected based on such reference blocks.

That is, in the bi-directional mode, the sub-pixel neighborhood in the forward reference frame is searched for a reference block; meanwhile, the sub-pixel neighborhood in the backward reference frame is also searched for a reference block; and a matching error between two found reference blocks is calculated. A minimum matching error is selected from all calculated matching errors, where two reference blocks corresponding to the minimum matching error are the reference blocks found in S220. The matching error may be an absolute error and SAD(sum of absolute differences).

In the forward mode, because the reference block in the forward reference frame is fixed, only the backward reference frame needs to be searched for a reference block. Each time a reference block is found, a matching error between the reference block and the reference block in the forward reference frame is calculated. A minimum matching error is selected from all calculated matching errors, where reference blocks corresponding to the minimum matching error are a reference block found in the backward reference frame and the reference block fixed in the forward reference frame.

In the backward mode, because the reference block in the backward reference frame is fixed, only the forward reference frame needs to be searched for a reference block. Each time a reference block is found, a matching error between the reference block and the reference block in the backward reference frame is calculated. A minimum matching error is selected from all calculated matching errors, where reference blocks corresponding to the minimum matching error are a reference block found in the forward reference frame and the reference block fixed in the backward reference frame.

Figure 3:
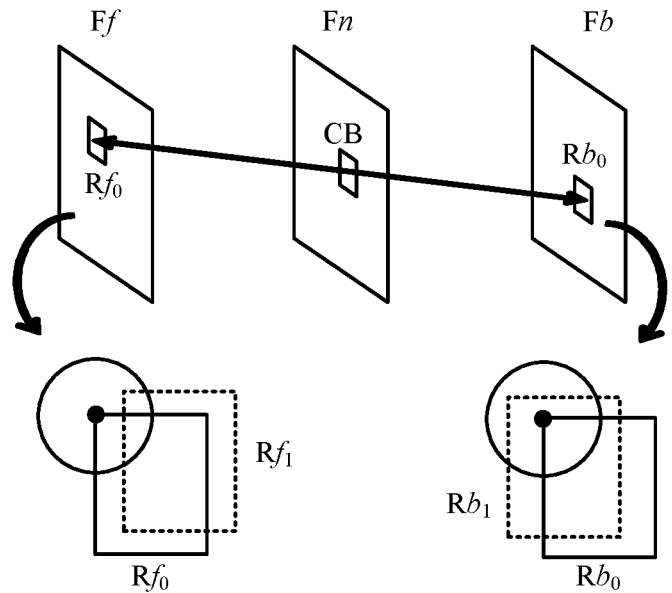
FIG. 3 is a schematic diagram of an example of correcting a motion vector according to an embodiment of the present invention.

How to search for reference blocks having a minimum matching error in a bi-directional mode is described by using FIG. 3 as an example. Those skilled in the art may easily think that searching for a reference block in a forward mode and in a backward mode is similar thereto.

In FIG. 3, a frame where a current block CB is located is Fn, a forward reference frame of the current block is Ff, and a backward reference frame of the current block is Fb. By performing S210, it is determined that initial reference blocks of the current block CB are $Rf_0$ and $Rb_0$. A circle is drawn by taking points at upper-left corners of the initial reference blocks $Rf_0$ and $Rb_0$ as circle centers and specific pixel distances (for example, ¼ pixel distance) as radiuses, thereby obtaining sub-pixel neighborhoods of the initial reference blocks, as shown by circular parts in FIG. 3. A process of searching for the reference blocks is constantly changing a motion vector of the current block CB, so that the upper-left corners of the initial reference blocks $Rf_0$ and $Rb_0$ move within their respective sub-pixel neighborhoods, thereby determining new reference blocks, for example, reference blocks $Rf_1$ and $Rb_1$.

It is assumed that a forward motion vector of an optimal merged candidate block is (candFMV_x, candFMV_y), and a backward motion vector is (candBMV_x, candBMV_y). The forward motion vector and the backward motion vector are also a forward motion vector and a backward motion vector of the current block, and directions indicated by the motion vectors are upper-left corners of the initial reference blocks, thereby determining $Rf_0$ and $Rb_0$.

In order to search for the reference blocks, the forward motion vector is shifted by (x, y), and the backward motion vector is shifted by (u, v). The forward motion vector after the change is (candFMV_x+x, candFMV_y+y), and the backward motion vector after the change is (candBMV_x+u, candBMV_y+v). Assuming that, based on the two motion vectors after the change, blocks Rf1 and Rb1 are obtained by moving the upper-left corners, a matching error between blocks Rf1 and Rb1 may be determined. The matching error may be a total of absolute values of differences between pixel values of corresponding pixels in the blocks $Rf_1$ and $Rb_1$. Based on the same mode, the shift of the motion vector is changed again, thereby determining a matching error between the blocks in such a case. In the same manner, multiple matching errors may be calculated. In these matching errors, a minimum matching error is selected, where a reference block corresponding to the matching error between the reference block and the current block is the finally found reference block.

In S230, the motion vector of the current block is corrected based on the found reference blocks.

After the reference blocks having the minimum matching error are found, a change of the motion vector of the current block with respect to the found reference blocks may be determined, thereby correcting the motion vector of the current block.

For example, in the example shown in FIG. 3, if a matching error obtained when the upper-left corner of the initial reference block $Rf_0$ is moved by (a, b) and the upper-left corner of the initial reference block $Rb_0$ is moved by (c, d) is minimum, the forward motion vector of the current block is corrected into (candFMV_x+a, candFMV_y+b), and the backward motion vector of the current block is corrected into (candBMV_x+c, candBMV_y+d).

The process of searching for the reference blocks having a minimum matching error also involves correcting the motion vector of the current block. The reference blocks having the minimum matching error are searched for by correcting the motion vector of the current block, and when the reference blocks having the minimum matching error are found, it indicates that correcting the motion vector of the current block is completed. A final result of the motion vector of the current block is obtained in S230.

In S140, a residual between a predicted value and an original value of the current block is determined based on the corrected motion vector, thereby encoding the current block.

The reference blocks of the current block may be determined based on the corrected motion vector, thereby predicting a predicted value of the current block according to the reference blocks. For example, a predicted value of the current block may be an average value of the reference block in the forward reference frame and the reference block in the backward reference frame.

Because the original value of the current block is known to the encoder, the encoder can determine the residual between the predicted value and the original value. The current block is encoded based on the residual, thereby generating an encoded bit stream of the current block.

According to an embodiment of the present invention, if the residual is smaller than an initial residual that is determined based on a motion vector merging technology, the residual and a first instruction flag for instructing the decoder to implement a motion vector derivation mode are carried in the encoded bit stream.

Based on the motion vector merging technology, the initial residual of the current block may be determined. Because it may be determined that the motion vector of the current block is the motion vector of the optimal merged candidate block based on the motion vector merging technology, a reference block in a reference frame may be determined for the current block, where the reference block may be the initial reference block mentioned above. The predicted value of the current block may be determined by using the initial reference block, thereby determining the residual between the predicted value and the original value of the current block. Because the residual is obtained without correcting the motion vector of the current block, the residual is the initial residual of the current block.

If a residual obtained based on the corrected motion vector is smaller than the initial residual, it indicates that a bit stream having fewer bits may be generated by using a motion vector derivation mode, and a more accurate prediction result is available; therefore, the encoder needs to instruct the decoder to implement the motion vector derivation mode, and use the same method as the encoder to correct the motion vector, thereby obtaining the predicted value and correcting the predicted value by using the residual. Therefore, in such a case, the residual and the first instruction flag for instructing the decoder to implement the motion vector derivation mode are carried in the encoded bit stream, so that the decoder implements the motion vector derivation mode according to the first instruction flag.

According to an embodiment of the present invention, if the residual is greater than or equal to the initial residual, the initial residual and a second instruction flag for instructing the decoder not to implement a motion vector derivation mode are carried in the encoded bit stream.

If the residual is greater than or equal to the initial residual, it indicates that more bits are generated by using the motion vector derivation mode, and the prediction result is not as good as a prediction result in a case where the motion vector is not corrected. Therefore, it is unnecessary to use the motion vector derivation mode to perform encoding. The initial residual is determined directly according to the motion vector that is not corrected, and the decoder is instructed not to implement the motion vector derivation mode. The decoder uses the initial motion vector of the current block to determine a predicted value, and then corrects the predicted value by using the initial residual. Therefore, in such a case, the initial residual and the second instruction flag for instructing the decoder not to implement the motion vector derivation mode are carried in the encoded bit stream, so that according to the second instruction flag, the decoder does not implement the motion vector derivation mode.

The first instruction flag and the second instruction flag may be two different values of a same instruction flag. For example, the first instruction flag refers to a case where a value of the instruction flag is 1, and the second instruction flag refers to a case where the value of the instruction flag is 0. Those skilled in the art may also think that the first instruction flag and the second instruction flag may also be instruction flags that independently occupy different positions of an encoded bit stream.

According to the encoding method provided by the embodiment of the present invention, compared with a conventional motion vector derivation technology of a decoder, in a process of correcting a motion vector of a current block to search for reference blocks having a minimum matching error, because a search range is limited to a small range of a sub-pixel neighborhood, and because a reference frame is fixed, calculation complexity may be reduced in comparison with searching in a large range. Compared with a conventional motion vector integration technology, the motion vector is corrected so that a predicted value is more accurate and a residual is smaller, thereby facilitating improvement of decoding quality; in addition, the residual occupies a smaller number of bits in an encoded bit stream, thereby improving encoding efficiency and avoiding an increase in data bandwidth.

Next, a decoding method for a video image according to an embodiment of the present invention is described with reference to FIG. 4 and FIG. 5.

Figure 4:
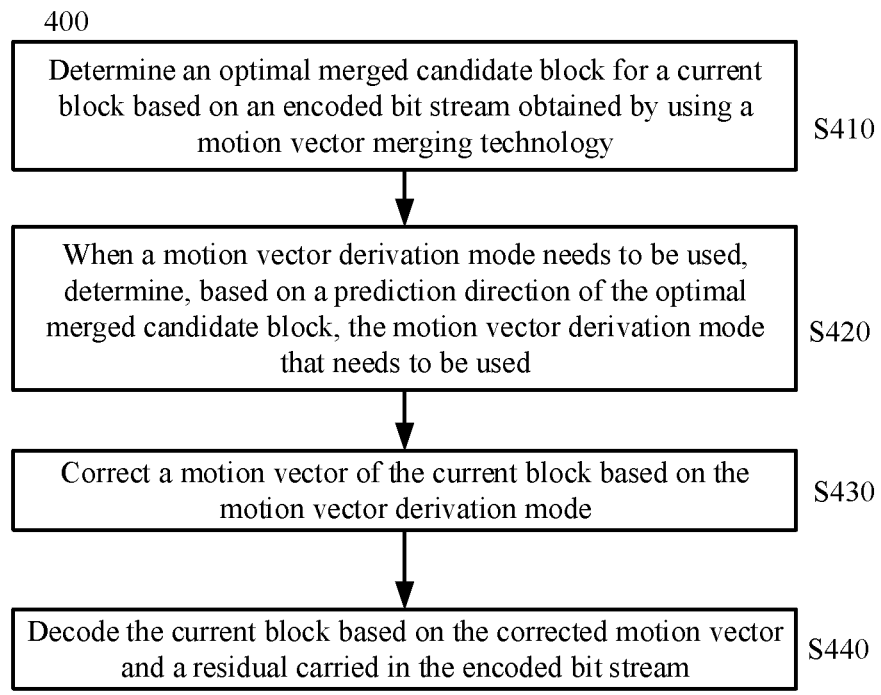
FIG. 4 is a flowchart of a decoding method for a video image according to an embodiment of the present invention.

As shown in FIG. 4, a decoding method 400 includes the following: in S410, an optimal merged candidate block for a current block is determined based on an encoded bit stream obtained by using a motion vector merging technology; in S420, when a motion vector derivation mode needs to be used, the motion vector derivation mode that needs to be used is determined based on a prediction direction of the optimal merged candidate block; in S430, a motion vector of the current block is corrected based on the motion vector derivation mode; and in S440, the current block is decoded based on the corrected motion vector and a residual carried in the encoded bit stream.

On a decoder, after the encoded bit stream based on the motion vector merging technology is received from an encoder, the optimal merged candidate block may be determined according to an index value carried in the encoded bit stream that uses the motion vector merging technology, of the optimal merged candidate block. If it is determined, according to information carried in the encoded bit stream, that a motion vector derivation mode needs to be used, then according to whether a prediction direction of the optimal merged candidate block is a bi-directional prediction, a forward prediction, or a backward prediction, a motion vector derivation technology is determined to correct an initial motion vector of the current block. After the corrected motion vector is obtained, a predicted value of the current block may be determined based on the motion vector, and a residual carried in the encoded bit stream is used to correct the predicted value, thereby decoding the current block.

According to the decoding method provided by the embodiment of the present invention, when it is necessary to use the motion vector derivation mode, the initial motion vector of the current block may be corrected to obtain a more accurate motion vector, thereby obtaining a more accurate predicted value; in addition, the correction is performed by using the residual, image decoding quality may be improved. Meanwhile, although the residual in the bit stream is small, on the basis that the correction for the motion vector does not affect the prediction for the current block, a residual having a smaller number of bits may be carried in the bit stream to perform prediction, thereby avoiding an increase in data bandwidth and facilitating improvement of encoding efficiency.

The decoding method 400 according to the embodiment of the present invention is described in detail as follows:

In S410, an optimal merged candidate block for a current block is determined based on an encoded bit stream obtained by using a motion vector merging technology.

The encoded bit stream may be decoded to obtain a flag indicating whether a motion vector merging technology is used, and information about the optimal merged candidate block may be obtained by decoding according to the flag. If a flag indicating that a motion vector merging technology is used is obtained by decoding, it is determined that the encoded bit stream uses the motion vector merging technology. In the encoded bit stream based on the motion vector merging technology, an index value and a residual of the optimal merged candidate block may be carried. Motion information of the optimal merged candidate block may be determined by using the index value, where the motion information may include a prediction direction, a motion vector, and reference frame information of the optimal merged candidate block.

In S420, when a motion vector derivation mode needs to be used, the motion vector derivation mode that needs to be used is determined based on the prediction direction of the optimal merged candidate block. In S430, the motion vector of the current block is corrected based on the motion vector derivation mode.

When the decoder determines that a motion vector derivation mode needs to be used, whether a bi-directional mode, a forward mode, or a backward mode needs to be used may be determined according to the prediction direction, and the motion vector of the current block may be corrected in different cases. Operations of S420 and S430 are basically the same as S120 and S130 of FIG. 1.

According to an embodiment of the present invention, the motion vector of the current block may be corrected according to the motion vector and reference frame information of the optimal merged candidate block.

Figure 5:
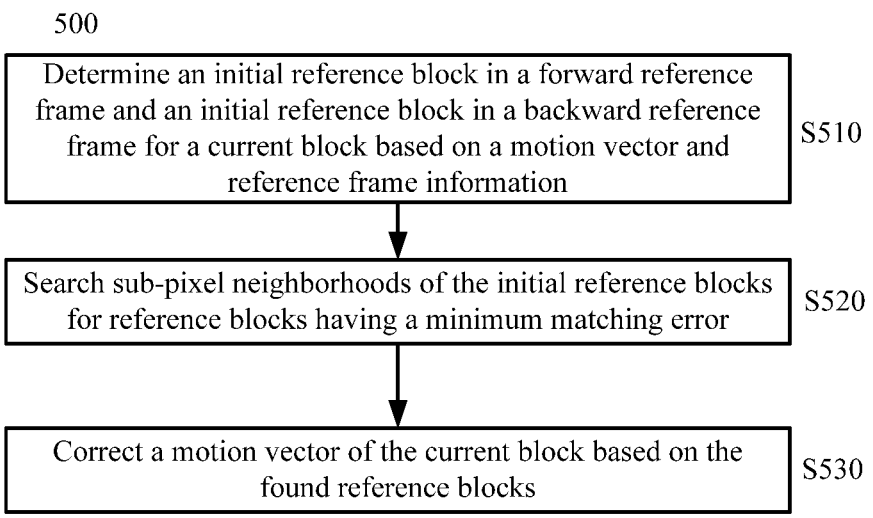
FIG. 5 is a flowchart of a method for correcting a motion vector according to an embodiment of the present invention.

According to an embodiment of the present invention, a method 500 shown in FIG. 5 may be used to correct the motion vector of the current block.

In S510, an initial reference block in a forward reference frame and an initial reference block in a backward reference frame are determined for the current block based on the motion vector and reference frame information; in S520, sub-pixel neighborhoods of the initial reference blocks are searched for reference blocks having a minimum matching error; and in S530, the motion vector of the current block is corrected based on the found reference blocks.

Operations of S510, S520, and S530 are basically the same as S210, S220, and S230 of FIG. 2, and to avoid repetition, details are not described herein again. According to the above description, the encoder and the decoder may correct the motion vector based on the same motion vector derivation process.

In S440, the current block is decoded based on the corrected motion vector and the residual carried in the encoded bit stream.

After the corrected motion vector is obtained, a reference block in the forward reference frame and a reference block in the backward reference frame may be determined for the current block, and the predicted value of the current block is determined based on the reference blocks. For example, the predicted value may be an average value of the reference blocks. Then, the predicted value is corrected based on the residual carried in the encoded bit stream, thereby obtaining a more accurate decoding value of the current block.

Figure 6:
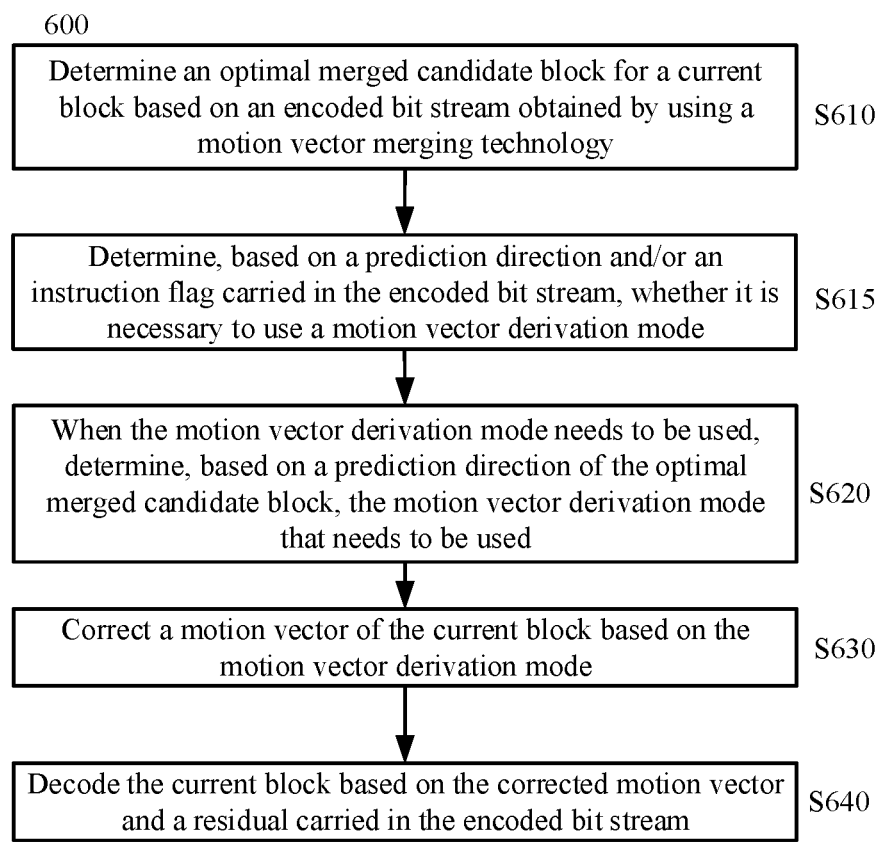
FIG. 6 is a flowchart of another decoding method for a video image according to an embodiment of the present invention.

FIG. 6 shows a flowchart of another decoding method 600 according to an embodiment of the present invention.

S610, S620, S630, and S640 in the decoding method 600 are basically the same as S410, S420, S430, and S440 in the decoding method 400 of FIG. 4.

According to an embodiment of the present invention, the decoding method 600 may further include S615 before S620. In S615, based on at least one of a prediction direction and an instruction flag which is carried in an encoded bit stream and is for instructing the decoder to implement a motion vector derivation mode or not, it is determined whether to use a motion vector derivation mode.

For example, if a prediction direction of an optimal merged candidate block is a bi-directional prediction, the decoder determines that a motion vector derivation mode needs to be used. If the prediction direction is a forward prediction or a backward prediction, the decoder determines not to use a motion vector derivation mode.

For another example, if an instruction flag for instructing the decoder to implement a motion vector derivation mode is carried in the encoded bit stream, the decoder determines that a motion vector derivation mode needs to be used. If an instruction flag for instructing the decoder not to implement a motion vector derivation mode is carried in the encoded bit stream, the decoder determines that it is unnecessary to use a motion vector derivation mode.

For a further example, if a prediction direction is a forward prediction, and an instruction flag for instructing the decoder to implement a motion vector derivation mode is carried in the encoded bit stream, the decoder determines that a motion vector derivation mode needs to be used. If the prediction direction is a backward prediction, and an instruction flag for instructing the decoder not to implement a motion vector derivation mode is carried in the encoded bit stream, the decoder determines that it is unnecessary to use a motion vector derivation mode.

S620, S630, and S640 are performed when it is determined, in S615, that a motion vector derivation mode needs to be used.

According to the decoding method provided by the embodiment of the present invention, compared with a conventional motion vector derivation technology of a decoder, in a process of correcting a motion vector of a current block to search for reference blocks having a minimum matching error, because a search range is limited to a small range of a sub-pixel neighborhood, and because a reference frame is fixed, calculation complexity may be reduced in comparison with searching in a large range. Compared with a conventional motion vector merging technology, the motion vector is corrected so that the predicted value is more accurate, and correction is performed by using the residual so that a decoding result is more accurate, thereby improving decoding quality. In addition, although the residual in the bit stream is small, on the basis that the correction for the motion vector does not affect the prediction for the current block, a residual having a smaller number of bits may be carried in the bit stream to perform prediction, thereby avoiding an increase in data bandwidth and facilitating improvement of encoding efficiency.

The encoding method and the decoding method for a video image according to the embodiments of the present invention are described above. The following describes an encoding apparatus for a video image according to an embodiment of the present invention with reference to FIG. 7 and FIG. 8, and describes a decoding apparatus for a video image according to an embodiment of the present invention with reference to FIG. 9 and FIG. 10.

Figure 7:
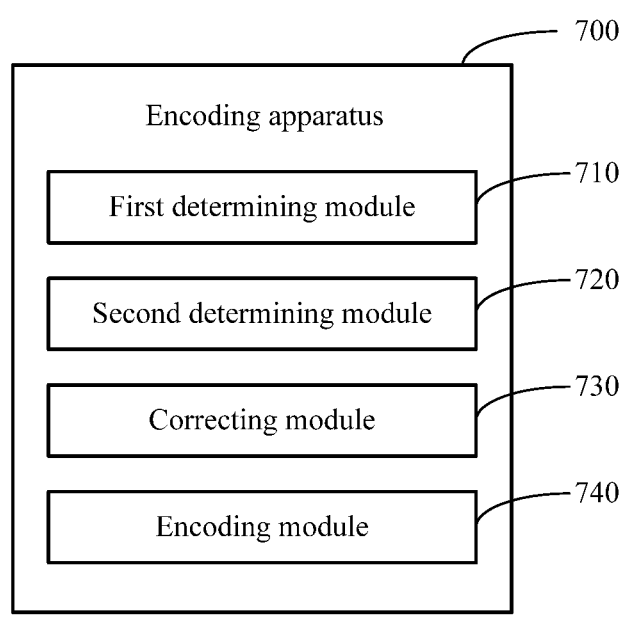
FIG. 7 is a structural block diagram of an encoding apparatus for a video image according to an embodiment of the present invention.

FIG. 7 is a structural block diagram of an encoding apparatus 700 according to an embodiment of the present invention.

The encoding apparatus 700 includes a first determining module 710, a second determining module 720, a correcting module 730, and an encoding module 740. The first determining module 710 may be configured to determine an optimal merged candidate block for a current block based on a motion vector merging technology. The second determining module 720 may be configured to determine, based on a prediction direction of the optimal merged candidate block, a motion vector derivation mode that needs to be used by a decoder. The correcting module 730 may be configured to correct a motion vector of the current block based on the motion vector derivation mode. The encoding module 740 may be configured to determine a residual between a predicted value and an original value of the current block based on the corrected motion vector, thereby encoding the current block.

Reference may be made to S110, S120, S130, and S140 in the encoding method 100 for the above and other operations and/or functions of the first determining module 710, the second determining module 720, the correcting module 730, and the encoding module 740 of the encoding apparatus 700, and details are not described herein again to avoid repetition.

With the encoding apparatus according to the embodiment of the present invention, a motion vector of a current block is determined firstly according to a motion vector of an optimal merged candidate block, and a motion vector derivation mode is used to correct the motion vector of the current block; therefore, the motion vector of the current block is more accurate, a calculated residual is smaller, and the residual occupies a smaller number of bits in an encoded bit stream, thereby improving encoding efficiency and avoiding an increase in data bandwidth. Meanwhile, because the corrected motion vector is used, a predicted value estimated based on the corrected motion vector is closer to an original value of the current block, and because correction is performed by using the residual, a more accurate decoding result may be obtained by a decoder, thereby improving image decoding quality.

Figure 8:
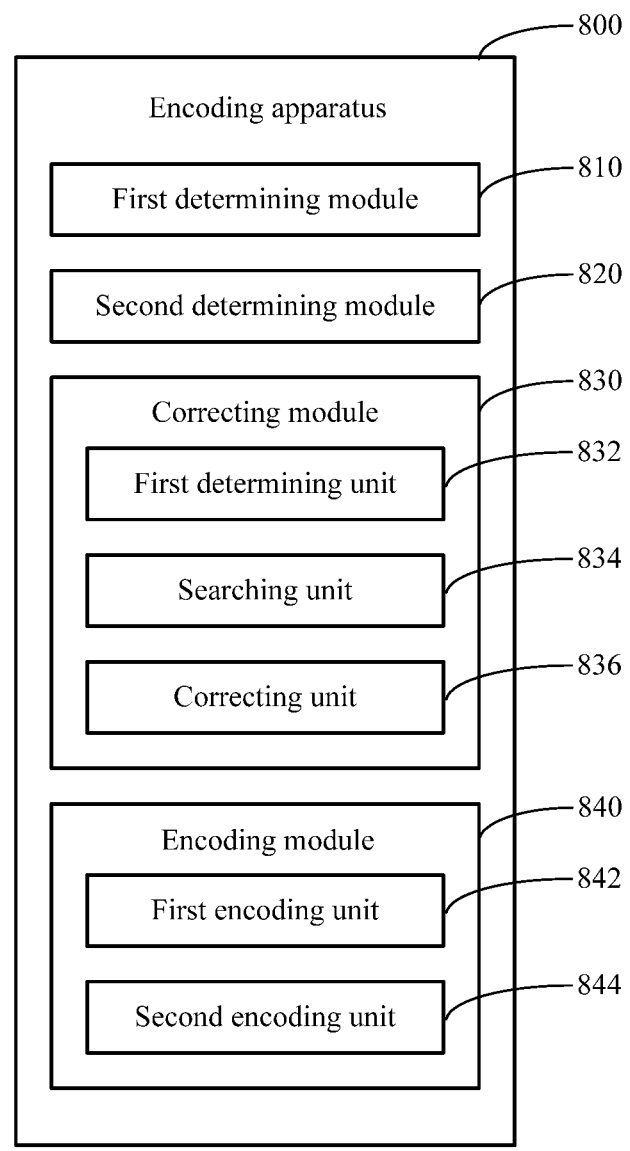
FIG. 8 is a structural block diagram of another encoding apparatus for a video image according to an embodiment of the present invention.

FIG. 8 shows a structural block diagram of another encoding apparatus 800 according to an embodiment of the present invention.

A first determining module 810, a second determining module 820, a correcting module 830, and an encoding module 840 in the encoding apparatus 800 are basically the same as the first determining module 710, the second determining module 720, the correcting module 730, and the encoding module 740 of the encoding apparatus 700 in FIG. 7.

According to an embodiment of the present invention, the correcting module 830 may be configured to correct a motion vector of a current block according to a motion vector and reference frame information of an optimal merged candidate block.

According to an embodiment of the present invention, the correcting module 830 may include a first determining unit 832, a searching unit 834, and a correcting unit 836. The first determining unit 832 may be configured to determine an initial reference block in a forward reference frame and an initial reference block in a backward reference frame for the current block based on the motion vector and the reference frame information. The searching unit 834 may be configured to search sub-pixel neighborhoods of the initial reference blocks for reference blocks having a minimum matching error. The correcting unit 836 may be configured to correct the motion vector of the current block based on the found reference blocks.

According to an embodiment of the present invention, the encoding module 840 may include a first encoding unit 842. The first encoding unit 842 may be configured to, if the residual is smaller than an initial residual that is determined based on a motion vector merging technology, carry, in an encoded bit stream, the residual and a first instruction flag for instructing a decoder to implement a motion vector derivation mode.

According to an embodiment of the present invention, the encoding module 840 may further include a second encoding unit 844. The second encoding unit 844 may be configured to, if the residual is greater than or equal to the initial residual, carry, in the encoded bit stream, the initial residual and a second instruction flag for instructing the decoder not to implement the motion vector derivation mode.

Reference may be made to S130 and S140 in the encoding method 100 and S210 to S230 in the method 200 for correcting a motion vector for the above and other operations and/or functions of the correcting module 830, the first determining unit 832, the searching unit 834, the correcting unit 836, the first encoding unit 842, and the second encoding unit 844, and details are not described herein again to avoid repetition.

According to the encoding apparatus provided by the embodiment of the present invention, compared with a conventional motion vector derivation technology of a decoder, in a process of correcting a motion vector of a current block to search for reference blocks having a minimum matching error, because a search range is limited to a small range of a sub-pixel neighborhood, and because a reference frame is fixed, calculation complexity may be reduced in comparison with searching in a large range. Compared with a conventional motion vector merging technology, the motion vector is corrected so that a predicted value is more accurate and a residual is smaller, thereby facilitating improvement of decoding quality; in addition, the residual occupies a smaller number of bits in an encoded bit stream, thereby improving encoding efficiency and avoiding an increase in data bandwidth.

Figure 9:
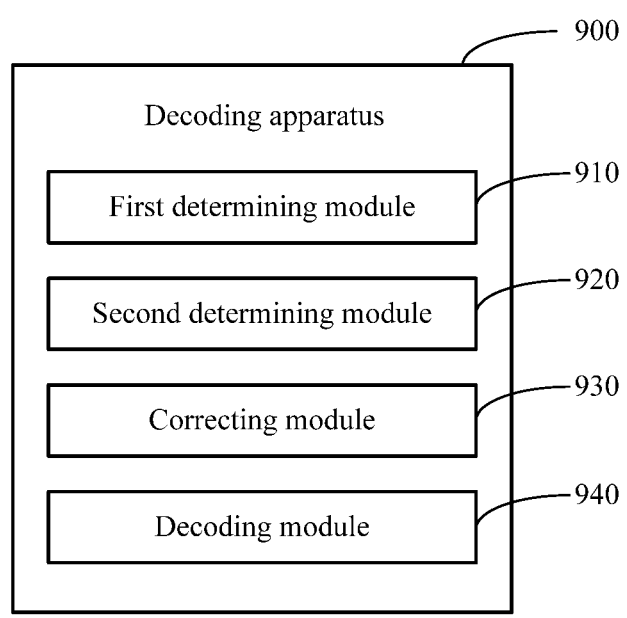
FIG. 9 is a structural block diagram of a decoding apparatus for a video image according to an embodiment of the present invention.

FIG. 9 shows a structural block diagram of a decoding apparatus 900 according to an embodiment of the present invention.

The decoding apparatus 900 includes a first determining module 910, a second determining module 920, a correcting module 930, and a decoding module 940. The first determining module 910 may be configured to determine an optimal merged candidate block for a current block based on an encoded bit stream obtained by using a motion vector merging technology. The second determining module 920 may be configured to, when a motion vector derivation mode needs to be used, determine, based on a prediction direction of the optimal merged candidate block, the motion vector derivation mode that needs to be used. The correcting module 930 may be configured to correct a motion vector of the current block based on the motion vector derivation mode. The decoding module 940 may be configured to decode the current block based on the corrected motion vector and a residual carried in the encoded bit stream.

Reference may be made to S410, S420, S430, and S440 in the decoding method 400 for the above and other operations and/or functions of the first determining module 910, the second determining module 920, the correcting module 930, and the decoding module 940 of the decoding apparatus 900, and details are not described herein again to avoid repetition.

With the decoding apparatus according to the embodiment of the present invention, when it is necessary to use a motion vector derivation mode, a more accurate motion vector may be obtained by correcting an initial motion vector of the current block, thereby obtaining a more accurate predicted value; in addition, the correction is performed by using the residual, image decoding quality may be improved. Meanwhile, although the residual in the bit stream is small, on the basis that the correction for the motion vector does not affect the prediction for the current block, a residual having a smaller number of bits may be carried in the bit stream to perform prediction, thereby avoiding an increase in data bandwidth and facilitating improvement of encoding efficiency.

Figure 10:
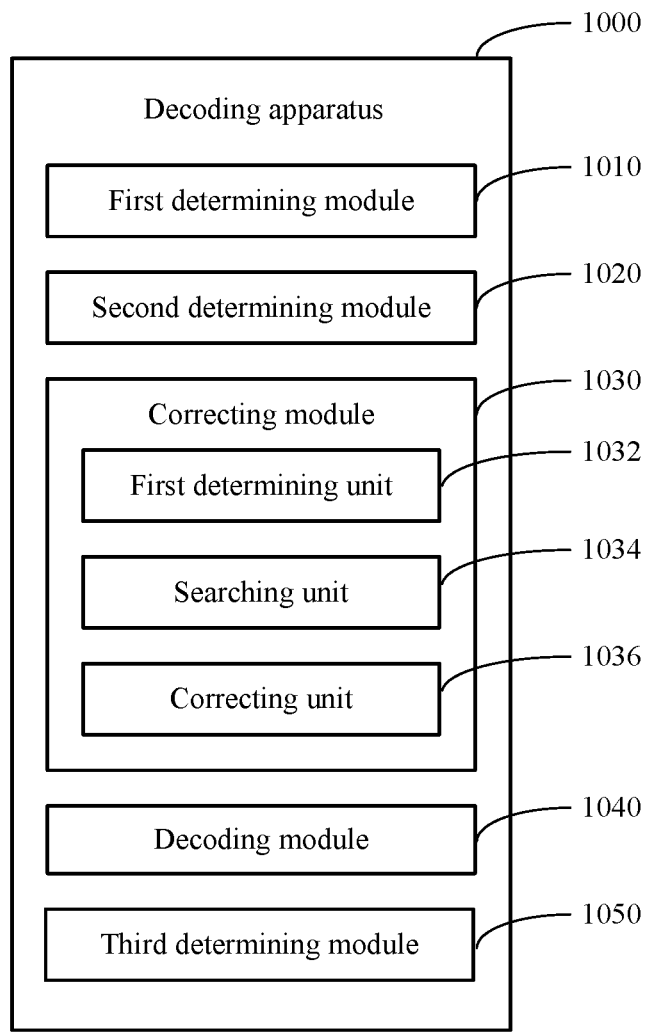
FIG. 10 is a structural block diagram of another decoding apparatus for a video image according to an embodiment of the present invention.

FIG. 10 shows a structural block diagram of another decoding apparatus 1100 according to an embodiment of the present invention.

A first determining module 1010, a second determining module 1020, a correcting module 1030, and a decoding module 1040 in the decoding apparatus 1000 are basically the same as the first determining module 910, the second determining module 920, the correcting module 930, and the decoding module 940 of the decoding apparatus 900 in FIG. 9.

According to an embodiment of the present invention, the correcting module 1030 may be configured to correct a motion vector of a current block according to a motion vector and reference frame information of an optimal merged candidate block.

According to an embodiment of the present invention, the correcting module 1030 may include a first determining unit 1032, a searching unit 1034, and a correcting unit 1036. The first determining unit 1032 may be configured to determine an initial reference block in a forward reference frame and an initial reference block in a backward reference frame for the current block based on the motion vector and the reference frame information. The searching unit 1034 may be configured to search sub-pixel neighborhoods of the initial reference blocks for reference blocks having a minimum matching error. The correcting unit 1036 may be configured to correct the motion vector of the current block based on the found reference blocks.

According to an embodiment of the present invention, the decoding module 1000 may further include a third determining module 1050. The third determining module 1050 may be configured to determine, based on at least one of a prediction direction and an instruction flag which is carried in an encoded bit stream and is for instructing a decoder to implement the motion vector derivation mode or not, whether to use a motion vector derivation mode. When the third determining module 1050 determines that the motion vector derivation mode needs to be used, the second determining module 1020, the correcting module 1030, and the decoding module 1040 need to complete corresponding operations.

Reference may be made to S430 in the decoding method 400, S510 to S530 in the method 500 for correcting a motion vector, and S615 in the decoding method 600 for the above and other operations and/or functions of the correcting module 1030, the first determining unit 1032, the searching unit 1034, the correcting unit 1036, and the third determining module 1050, and details are not described herein again to avoid repetition.

According to the decoding apparatus provided by the embodiment of the present invention, compared with a conventional motion vector derivation technology of a decoder, in a process of correcting a motion vector of a current block to search for reference blocks having a minimum matching error, because a search range is limited to a small range of a sub-pixel neighborhood, and because a reference frame is fixed, calculation complexity may be reduced in comparison with searching in a large range. Compared with a conventional motion vector merging technology, the motion vector is corrected so that the predicted value is more accurate, and correction is performed by using the residual so that a decoding result is more accurate, thereby improving decoding quality. In addition, although the residual in the bit stream is small, on the basis that the correction for the motion vector does not affect the prediction for the current block, a residual having a smaller number of bits may be carried in the bit stream to perform prediction, thereby avoiding an increase in data bandwidth and facilitating improvement of encoding efficiency.

Figure 11:
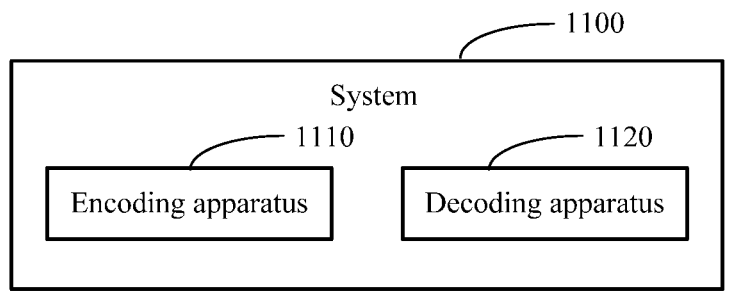
FIG. 11 is a schematic diagram of a system for a video image according to an embodiment of the present invention.

Next, a system 1100 for a video image according to an embodiment of the present invention is described with reference to FIG. 11. The system 1100 may be used to encode and decode a video image.

The system 1100 includes an encoding apparatus 1110 and a decoding apparatus 1120.

The encoding apparatus 1110 may be the encoding apparatus 700 shown in FIG. 7, and the decoding apparatus 1120 may be the decoding apparatus 900 shown in FIG. 9.

The encoding apparatus 1110 may further include the correcting module 830, the first determining unit 832, the searching unit 834, the correcting unit 836, the first encoding unit 842, and the second encoding unit 844 shown in FIG. 8. The decoding apparatus 1120 may further include the correcting module 1030, the first determining unit 1032, the searching unit 1034, and the correcting unit 1036 shown in FIG. 10.

According to the system for encoding and decoding a video image provided by the embodiment of the present invention, a motion vector in a motion vector merging technology is corrected by using a motion vector derivation technology, so that a more accurate predicted value of a current block may be obtained, thereby reducing a residual between the predicted value and an original value, and an encoder is allowed to encode the residual into an encoded bit stream by using a small number of bits, thereby improving encoding efficiency and avoiding an increase in data bandwidth. Meanwhile, because the corrected motion vector is used, a predicted value estimated based on the corrected motion vector is closer to an original value of the current block, and because correction is performed by using the residual, a decoder may obtain a more accurate decoding result, thereby improving image decoding quality.

According to the system provided by the embodiment of the present invention, compared with a conventional motion vector derivation technology of a decoder, in a process of correcting a motion vector of a current block to search for reference blocks having a minimum matching error, because a search range is limited to a small range of a sub-pixel neighborhood, calculation complexity may be reduced in comparison with searching in a large range. Compared with a conventional motion vector merging technology, the motion vector is corrected so that a predicted value is more accurate and a residual is smaller, thereby facilitating improvement of decoding quality; in addition, the residual occupies a smaller number of bits in an encoded bit stream, thereby improving encoding efficiency and avoiding an increase in data bandwidth.

Those skilled in the art may note that, the method steps and units with reference to the description in the embodiments disclosed herein may be implemented by using electronic hardware, computer software, or a combination thereof, and in order to clearly describe interchangeability of hardware and software, the above description describes steps and combinations of various embodiments according to general functions. These functions may be executed in a mode of hardware or software depending on the specific application and design constraint condition of the technical solutions. Those skilled in the art may use different methods for each specific application to implement the described functions; however, the implementation shall not be regarded as exceeding the scope of the present invention.

The technology according to the embodiments of the present invention may be applied in a digital signal processing field, and may be implemented by using an encoder and a decoder. A video encoder and a video decoder are widely used in various communication devices or electronic devices, such as a digital television, set-top box, media gateway, mobile phone, wireless apparatus, personal digital assistant (PDA), hand-held or portable computer, GPS receiver/navigator, camera, video player, video camera, video recorder, monitoring device, videoconferencing and videophone device. These devices each include a processor, a storage, and an interface for transferring data. The video encoder and decoder may be implemented directly by using a digital circuit or chip, such as a DSP (digital signal processor), or may be implemented by using a software code to drive a processor to execute a procedure in the software code.

The method steps with reference to the description of the embodiments disclosed herein may be implemented by using hardware, a software program to be executed by a processor, or a combination thereof. The software program may be placed in a random access memory (RAM), a memory, a read-only memory (ROM), an electrically programmable ROM, and an electrically erasable programmable ROM, a register, a hard disk, a removable magnetic disk, a CD-ROM, or the storage media of any other forms well-known in the art.

Although some embodiments of the present invention are shown and described, those skilled in the art shall understand that various modification may be made to the embodiments without departing from the principle and idea of the present invention, and such modifications shall fall within the scope of the present invention.

What is claimed is:

1. A method of encoding for a video image, comprising:
   determining an optimal merged candidate block for a current block based on a motion vector merging technology, wherein a motion vector of the optimal merged candidate block is closest to and used as a substitute of a motion vector for the current block in the motion vector merging technology;
   based on one or a combination of a prediction direction of the optimal merged candidate block and an instruction flag which is carried in an encoded bit stream and is for instructing a decoder to use a motion vector derivation mode or not, determining whether to use the motion vector derivation mode;
   determining, based on the prediction direction of the optimal merged candidate block, the motion vector derivation mode that needs to be used by a decoder;

correcting the motion vector of the current block based on the motion vector derivation mode;
determining a residual between a predicted value of the current block and an original value of the current block based on the corrected motion vector, wherein the predicted value of the current block is based on the corrected motion vector; and
encoding the residual and an index value of the optimal merged candidate block into an encoded bit stream transmitted to the decoder.

2. The method according to claim 1, wherein the correcting a motion vector of the current block comprises:
correcting the motion vector of the current block according to the motion vector and reference frame information of the optimal merged candidate block.

3. The method according to claim 2, wherein the correcting a motion vector of the current block comprises:
determining an initial reference block in a forward reference frame and an initial reference block in a backward reference frame for the current block based on the motion vector and the reference frame information;
searching sub-pixel neighborhoods of the initial reference blocks for reference blocks having a minimum matching error; and
correcting the motion vector of the current block based on the found reference blocks.

4. The method according to claim 1, wherein the encoding the residual and an index value of the optimal merged candidate block into an encoded bit stream transmitted to the decoder comprises:
upon determining the residual is smaller than an initial residual that is determined based on the motion vector merging technology, carrying the residual and a first instruction flag for instructing the decoder to use the motion vector derivation mode into the encoded bit stream.

5. The method according to claim 4, wherein the encoding the residual and an index value of the optimal merged candidate block into an encoded bit stream transmitted to the decoder further comprises:
upon determining the residual is greater than or equal to the initial residual, carrying the initial residual and a second instruction flag for instructing the decoder not to use the motion vector derivation mode into the encoded bit stream.

6. A method of decoding for a video image, comprising:
determining an optimal merged candidate block for a current block based on an index value of the optimal merged candidate block in an encoded bit stream which is received from an encoder and obtained by the encoder using a motion vector merging technology, wherein a motion vector of the optimal merged candidate block is closest to and used as a substitute of a motion vector for the current block in the motion vector merging technology;
based on one or a combination of a prediction direction of the optimal merged candidate block and an instruction flag which is carried in the encoded bit stream and is for instructing a decoder to use a motion vector derivation mode or not, determining whether to use the motion vector derivation mode;
determining, based on the prediction direction of the optimal merged candidate block, the motion vector derivation mode that needs to be used;
correcting the motion vector of the current block based on the determined motion vector derivation mode; and
decoding the current block based on the corrected motion vector and a residual carried in the encoded bit stream.

7. The method according to claim 6, wherein the correcting a motion vector of the current block comprises:
correcting the motion vector of the current block according to the motion vector and reference frame information of the optimal merged candidate block.

8. The method according to claim 7, wherein the correcting a motion vector of the current block comprises:
determining an initial reference block in a forward reference frame and an initial reference block in a backward reference frame for the current block based on the motion vector and the reference frame information;
searching sub-pixel neighborhoods of the initial reference blocks for reference blocks having a minimum matching error; and
correcting the motion vector of the current block based on the found reference blocks.

9. An encoding apparatus for a video image, comprising:
at least one hardware processor;
a memory including instructions to control the at least one hardware processor to:
determine an optimal merged candidate block for a current block based on a motion vector merging technology, wherein a motion vector of the optimal merged candidate block is closest to and used as a substitute of a motion vector for the current block in the motion vector merging technology;
based on one or a combination of a prediction direction of the optimal merged candidate block and an instruction flag which is carried in an encoded bit stream and is for instructing a decoder to use a motion vector derivation mode or not, determining whether to use the motion vector derivation mode;
determine, based on the prediction direction of the optimal merged candidate block, the motion vector derivation mode that needs to be used by a decoder;
correct the motion vector of the current block based on the motion vector derivation mode; determine a residual between a predicted value of the current block and an original value of the current block based on the corrected motion vector, wherein the predicted value of the current block is based on the corrected motion vector; and
encode the residual and an index value of the optimal merged candidate block into an encoded bit stream transmitted to the decoder.

10. The encoding apparatus according to claim 9, wherein the instruction further control the at least one hardware processor to correct the motion vector of the current block according to the motion vector and reference frame information of the optimal merged candidate block.

11. The encoding apparatus according to claim 10, wherein the instruction further control the at least one hardware processor to:
determine an initial reference block in a forward reference frame and an initial reference block in a backward reference frame for the current block based on the motion vector and the reference frame information;
search sub-pixel neighborhoods of the initial reference blocks for reference blocks having a minimum matching error; and
correct the motion vector of the current block based on the found reference blocks.

12. The encoding apparatus according to claim 9, wherein the instruction further control the at least one hardware processor to:

upon determining the residual is smaller than an initial residual that is determined based on the motion vector merging technology, carry the residual and a first instruction flag for instructing the decoder to use the motion vector derivation mode into the encoded bit stream.

13. The encoding apparatus according to claim 12, wherein the instruction further control the at least one hardware processor to:

upon determining the residual is greater than or equal to the initial residual, carry the initial residual and a second instruction flag for instructing the decoder not to use the motion vector derivation mode into the encoded bit stream.

14. A decoding apparatus for a video image, comprising:
at least one hardware processor;
a memory including instructions to control the at least one hardware processor to:
determine an optimal merged candidate block for a current block based on an index value of the optimal merged candidate block in an encoded bit stream which is received from an encoder and obtained by the encoder using a motion vector merging technology, wherein a motion vector of the optimal merged candidate block is closest to and used as a substitute of a motion vector for the current block in the motion vector merging technology;
based on one or a combination of a prediction direction of the optimal merged candidate block and an instruction flag which is carried in the encoded bit stream and is for instructing a decoder to use a motion vector derivation mode or not, determine whether to use the motion vector derivation mode;
determine, based on the prediction direction of the optimal merged candidate block, the motion vector derivation mode that needs to be used;
correct the motion vector of the current block based on the determined motion vector derivation mode; and
decode the current block based on the corrected motion vector and a residual carried in the encoded bit stream.

15. The decoding apparatus according to claim 14, wherein the instructions further control the at least one hardware processor to correct the motion vector of the current block according to the motion vector and reference frame information of the optimal merged candidate block.

16. The decoding apparatus according to claim 15, wherein the instructions further control the at least one hardware processor to:
determine an initial reference block in a forward reference frame and an initial reference block in a backward reference frame for the current block based on the motion vector and the reference frame information;
search sub-pixel neighborhoods of the initial reference blocks for reference blocks having a minimum matching error; and
correct the motion vector of the current block based on the found reference blocks.

\* \* \* \* \*